(12) United States Patent
Takahashi

(10) Patent No.: US 8,891,107 B2
(45) Date of Patent: Nov. 18, 2014

(54) IMAGE FORMING APPARATUS, CONTROL METHOD THEREOF AND COMPUTER-READABLE STORAGE MEDIUM

(71) Applicant: Canon Kabushiki Kaisha, Tokyo (JP)

(72) Inventor: Yasuhiro Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/047,271

(22) Filed: Oct. 7, 2013

(65) Prior Publication Data

US 2014/0036300 A1 Feb. 6, 2014

Related U.S. Application Data

(63) Continuation of application No. 12/887,939, filed on Sep. 22, 2010, now Pat. No. 8,599,399.

(30) Foreign Application Priority Data

Oct. 15, 2009 (JP) .................................. 2009-238656

(51) Int. Cl.
| | |
|---|---|
| G06F 15/00 | (2006.01) |
| H04N 1/04 | (2006.01) |
| G03G 21/04 | (2006.01) |
| H04N 1/32 | (2006.01) |
| H04N 1/00 | (2006.01) |
| H04N 1/387 | (2006.01) |
| H04N 1/44 | (2006.01) |
| G03G 15/00 | (2006.01) |

(52) U.S. Cl.
CPC .......... *H04N 1/44* (2013.01); *H04N 2201/3269* (2013.01); *H04N 2201/328* (2013.01);

(Continued)

(58) Field of Classification Search
USPC ........................................................ 358/1.14
See application file for complete search history.

(56) References Cited

U.S. PATENT DOCUMENTS 6,661,933 B1 12/2003 Hisatomi et al.
7,006,660 B2 2/2006 Hayashi
(Continued)

FOREIGN PATENT DOCUMENTS

CN 101521714 A 9/2009
JP 01147561 A 6/1989
(Continued)

OTHER PUBLICATIONS

Notice of the First Office Action, dated Dec. 14, 2012, issued by the State Intellectual Property Office of the People's Republic of China, in counterpart Chinese Application No. 201010513470.X.

(Continued)

*Primary Examiner* — Saeid Ebrahimi Dehkordy
(74) *Attorney, Agent, or Firm* — Fitzpatrick, Cella, Harper & Scinto

(57) ABSTRACT

This invention provides an image forming apparatus capable of reliably printing security information even when image data of an original document that is obtained by a reading unit contains security information and an area where the security information is not contained is set as a print area, and a control method thereof. To accomplish this, when image data of an original document contains security information, the image forming apparatus extracts image the security information from data, and sets a print target area from an area indicated by the image data of the original document. When an area corresponding to, from which the security information is extracted, is not contained in the set print target area, the image forming apparatus executes printing using the extracted image data corresponding to the security information, and the image data corresponding to the print target area.

9 Claims, 16 Drawing Sheets

(52) U.S. Cl.
CPC ...... *H04N 1/0408* (2013.01); *H04N 2201/3274* (2013.01); *G03G 21/043* (2013.01); *H04N 1/0455* (2013.01); *H04N 1/32149* (2013.01); *H04N 1/00639* (2013.01); *H04N 2201/0426* (2013.01); *H04N 2201/3271* (2013.01); *H04N 1/0405* (2013.01); *H04N 1/0035* (2013.01); *H04N 1/00867* (2013.01); *H04N 1/00424* (2013.01); *H04N 1/00435* (2013.01); *H04N 1/3875* (2013.01); *H04N 2201/3276* (2013.01); *H04N 1/0087* (2013.01); *H04N 1/00411* (2013.01); *H04N 1/00474* (2013.01); *H04N 2201/0416* (2013.01); *H04N 1/3871* (2013.01); *H04N 1/0084* (2013.01); *H04N 1/00482* (2013.01); *G03G 15/502* (2013.01)
USPC ...................................................... 358/1.14

(56) References Cited

U.S. PATENT DOCUMENTS

| | | | |
|---|---|---|---|
| 7,567,355 | B2 | 7/2009 | Matsunoshita |
| 7,692,811 | B2 | 4/2010 | Tamai et al. |
| 8,049,917 | B2 | 11/2011 | Noguchi et al. |
| 2003/0059086 | A1 | 3/2003 | Hayashi |
| 2007/0008586 | A1* | 1/2007 | Tamai et al. ................. 358/3.28 |
| 2008/0018944 | A1 | 1/2008 | Ikeno et al. |
| 2008/0024828 | A1* | 1/2008 | Isoda .......................... 358/3.28 |
| 2008/0074695 | A1 | 3/2008 | Takahiro et al. |
| 2009/0161149 | A1 | 6/2009 | Noguchi et al. |
| 2009/0219561 | A1 | 9/2009 | Kozuka |
| 2011/0090526 | A1* | 4/2011 | Takahashi ................... 358/1.14 |

FOREIGN PATENT DOCUMENTS

| | | |
|---|---|---|
| JP | 2003-280469 | 10/2003 |
| JP | 2005005768 A | 1/2005 |
| JP | 2006-262078 A | 9/2006 |
| JP | 2007019841 A | 1/2007 |
| JP | 2008-124633 A | 5/2008 |
| JP | 2009152993 A | 7/2009 |

OTHER PUBLICATIONS

Office Action, dated Dec. 20, 2012, issued in Korean Patent Application No. 10-2010-0100113.

European Official Action, dated Feb. 17, 2011, issued in European Patent Application No. 10187632.4.

* cited by examiner

IMAGE FORMING APPARATUS, CONTROL METHOD THEREOF AND COMPUTER-READABLE STORAGE MEDIUM

This application is a Continuation of U.S. application Ser. No. 12/887,939, filed Sep. 22, 2010, and allowed Jul. 16, 2013, which claims the benefit of Japanese Patent Application No. 2009-238656 filed on Oct. 15, 2009, which is hereby incorporated by reference herein in its entirety.

BACKGROUND OF THE INVENTION

1. Field of the Invention

The present invention relates to an image forming apparatus, control method thereof and computer-readable storage medium.

2. Description of the Related Art

As information technology becomes prevalent in offices, security is becoming a big concern. Leakage of digital confidential information can be prevented by access restriction and the like. However, when confidential information is printed on paper by an image forming apparatus or the like, it is difficult to check or inhibit printed paper from being carried out.

As a measure against this, a system is proposed that prints security information such as a digital watermark or QR code on paper. Even if paper-based information leakage occurs, this system extracts security information from the leaked paper, specifying a user and apparatus that printed the paper. A system of this type is proposed in, for example, Japanese Patent Laid-Open No. 2003-280469.

However, the conventional technique suffers the following problem. For example, when a QR code is printed as security information, it is printed only on part of the paper. If only an area of the paper where the QR code is not printed is scanned and copied, the QR code is not printed.

SUMMARY OF THE INVENTION

The present invention realizes an image forming apparatus capable of reliably printing security information even when the image data of an original document that is obtained by a reading unit contains security information and an area where the security information is not contained is set as a print area, and a control method thereof and computer-readable storage medium.

One aspect of the present invention provides an image forming apparatus comprising: a first reading unit that reads an original document to obtain image data of the original document; an extraction unit that, when the image data of the original document that is obtained by the first reading unit contains security information, extracts the security information from the image data of the original document; a setting unit that sets a print target area from an area indicated by the image data of the original document that is obtained by the first reading unit; and a printing unit that, when an area corresponding to the image data, from which the security information is extracted, is not contained in the set print target area, executes printing using the image data corresponding to the security information and image data corresponding to the print target area.

Another aspect of the present invention provides a control method for controlling an image forming apparatus comprising: reading an original document for obtaining image data of the original document; extracting, when the image data of the original document that is obtained by reading the original document contains security information, the security information from the image data of the original document; setting a print target area from an area indicated by the image data of the original document that is obtained by reading the original document; and executing, when an area corresponding to the image data, from which the security information is extracted, is not contained in the set print target area, printing using the image data corresponding to the security information and image data corresponding to the print target area.

Still another aspect of the present invention provides a computer-readable storage medium storing a computer program for causing a computer to execute the method for controlling an image forming apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

Figure 1:
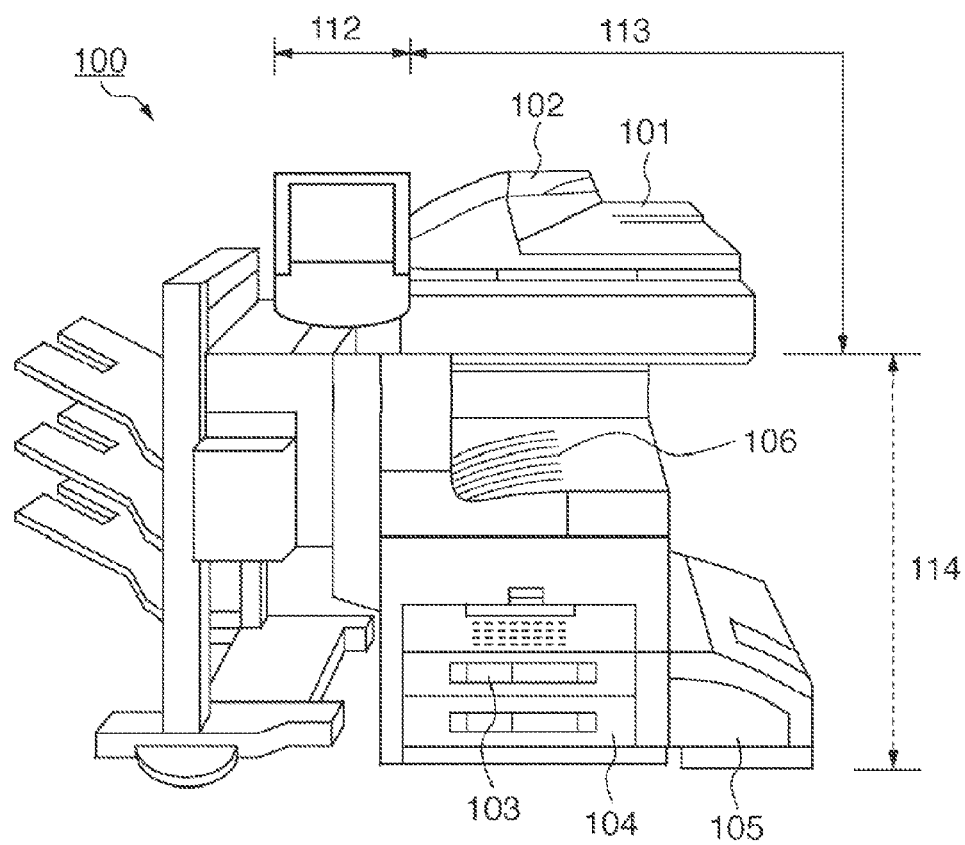
FIG. 1 is a view showing the outer appearance of an image forming apparatus 100 according to an embodiment.

The arrangement of an image forming apparatus 100 according to an embodiment will be exemplified with reference to FIG. 1. The image forming apparatus 100 includes an operation unit 112, scanner 113, and printer 114. The scanner 113 exposes and scans an image on an original document, and a photosensitive element such as a CCD (Charge Coupled Device) or CIS (Contact Image Sensor) receives the reflected light, converting the image information into an electrical signal. The scanner 113 further converts the electrical signal into luminance signals of R, G, and B colors, outputting the luminance signals as image data.

The user sets an original document on a tray 102 of an original document feeder 101. When the user issues a reading start instruction via the operation unit 112, the scanner 113 receives the original document reading instruction. Upon receiving the reading instruction, the scanner 113 conveys original document sheets one by one from the tray 102 of the original document feeder 101, and reads them. Note that the original document reading method is not limited to the automatic conveyance method using the original document feeder 101. It is also possible to set an original document on a glass surface (not shown), move an exposure unit, and scan the original document.

The printer 114 is an image forming device which forms an image on a print medium such as paper in accordance with image data. As the image forming method, the embodiment will exemplify an electrophotographic method using a photosensitive drum and photosensitive belt, but the present invention is not limited to this. For example, an inkjet method of discharging ink from a small nozzle array to print on paper is also applicable to the present invention. The printer 114 includes a plurality of paper cassettes 103, 104, and 105 which allow selecting different paper sizes or different paper orientations. Printed paper is discharged onto a discharge tray 106.

<Control Arrangement of Image Forming Apparatus>

Figure 2:
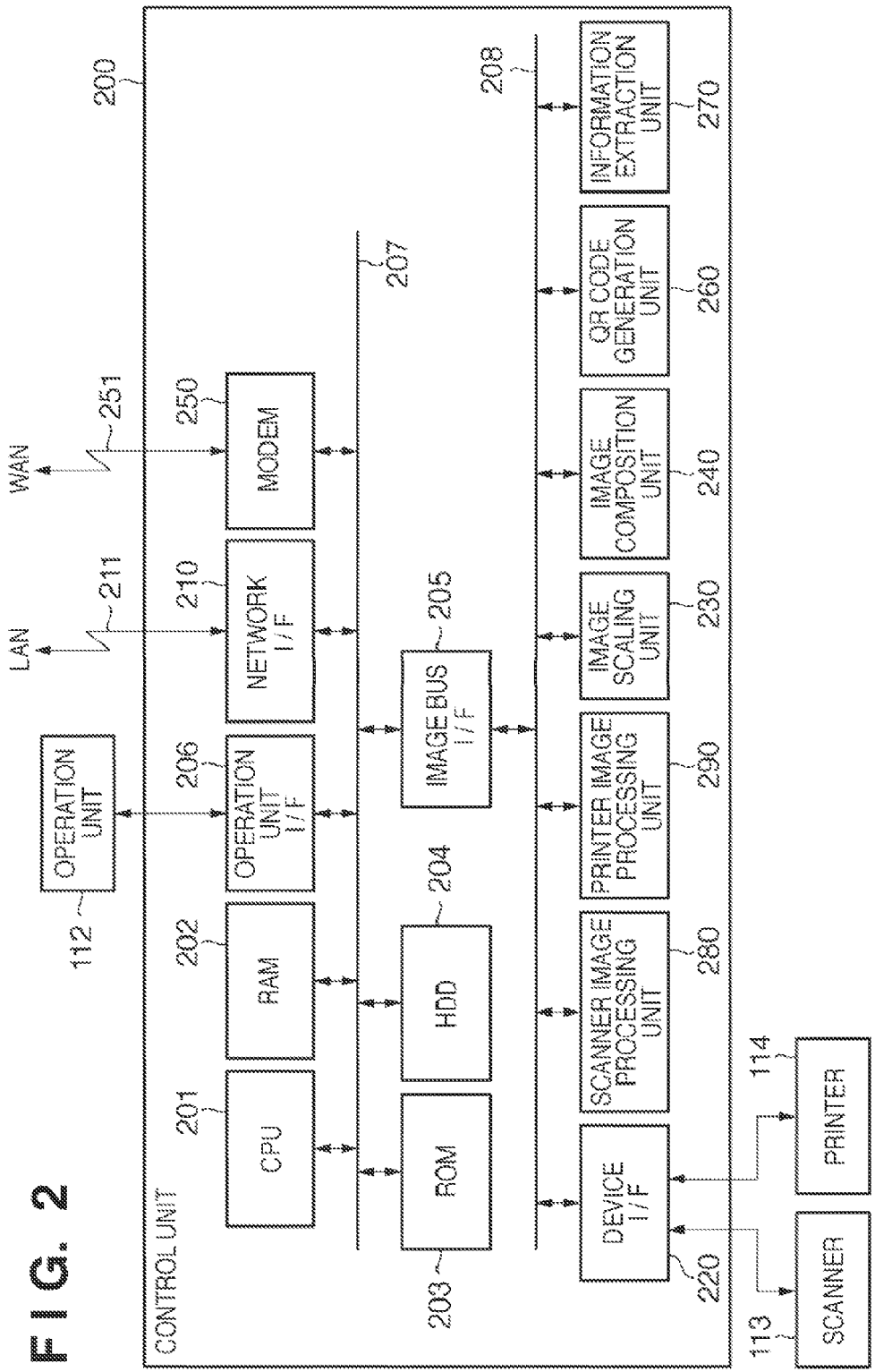
FIG. 2 is a block diagram of the system of the image forming apparatus 100 according to the embodiment.

The control arrangement of the image forming apparatus 100 will be described with reference to FIG. 2. The image forming apparatus 100 includes a control unit 200 as a control block. As shown in FIG. 2, the operation unit 112, scanner 113, and printer 114 are connected to the control unit 200. By connecting a LAN 211 and public line (WAN) 251 to the control unit 200, image information and device information are input/output to/from the control unit 200. The control unit 200 includes a CPU 201, RAM 202, ROM 203, HDD (Hard Disk Drive) 204, image bus I/F 205, operation unit I/F 206, network I/F 210, modem 250, device I/F 220, scanner image processing unit 280, printer image processing unit 290, image scaling unit 230, image composition unit 240, QR code generation unit 260, and information extraction unit 270.

The CPU 201 is a controller for controlling the overall system. The RAM 202 is a system work memory for operating the CPU 201, and is also an image memory for temporarily storing image data. The ROM 203 is a boot ROM which stores a system boot program. The HDD 204 stores system software and image data.

The operation unit I/F 206 is an interface with the operation unit 112 having a touch panel (display unit). The operation unit I/F 206 outputs image data to be displayed on the operation unit 112 to the operation unit 112. Also, the operation unit I/F 206 transfers, to the CPU 201, information input by the user via the operation unit 112. The network I/F 210 is connected to the LAN 211 to input/output information. The modem 250 is connected to the public line 251 to input/output information. These devices are arranged on a system bus 207. The image bus I/F 205 is a bus bridge which connects the system bus 207 and an image bus 208 for transferring image data at high speed, and converts a data structure. The image bus 208 is formed from a PCI bus or IEEE1394 bus. The following devices are arranged on the image bus 208. The device I/F 220 connects the scanner 113 and printer 114 serving as image input/output devices to the control unit 200, and performs synchronous/asynchronous conversion of image data.

The scanner image processing unit 280 corrects, processes, and edits input image data. The printer image processing unit 290 executes printer correction and the like for printout image data. The image scaling unit 230 scales image data. The image composition unit 240 composites two input image data. The QR code generation unit 260 generates a corresponding QR code, which is a two-dimensional barcode, from input data. Note that the embodiment will exemplify a QR code as security information, but another two-dimensional barcode, digital watermark, or the like is also usable as security information in the present invention. The information extraction unit 270 functions as an extraction unit to cut out a QR code image from image data and extract security information.

<QR Code Embedding Copy Setting>

Figure 3:
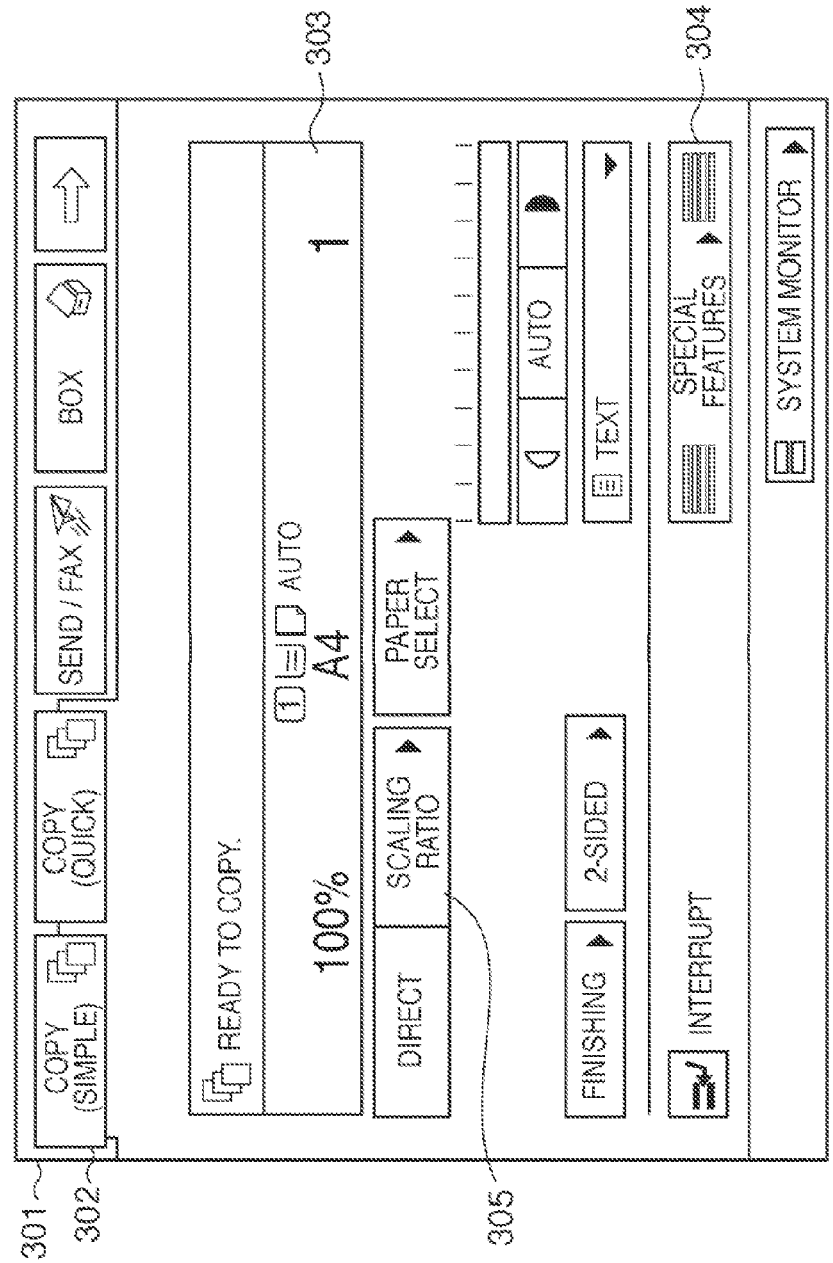
FIG. 3 is a view showing a normal copy screen 301 in the image forming apparatus 100 according to the embodiment.
Figure 4:
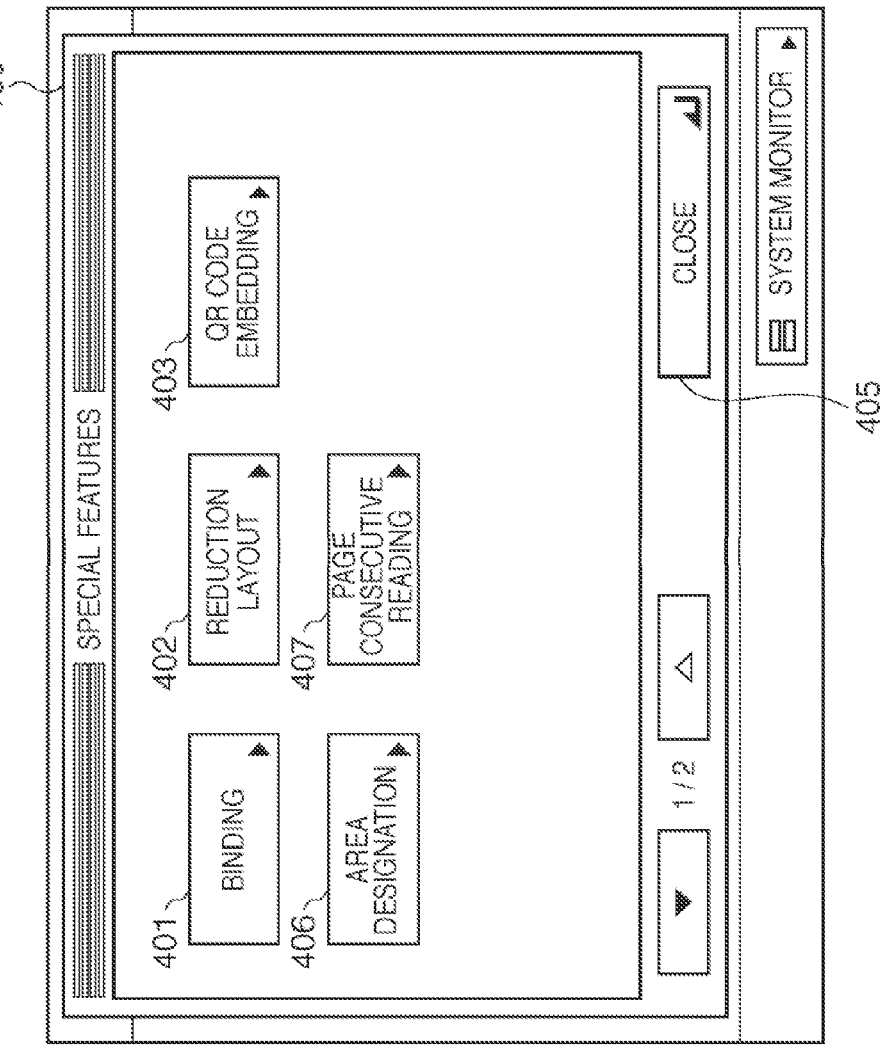
FIG. 4 is a view showing a setting screen 400 for setting a copy operation according to the embodiment.
Figure 5:
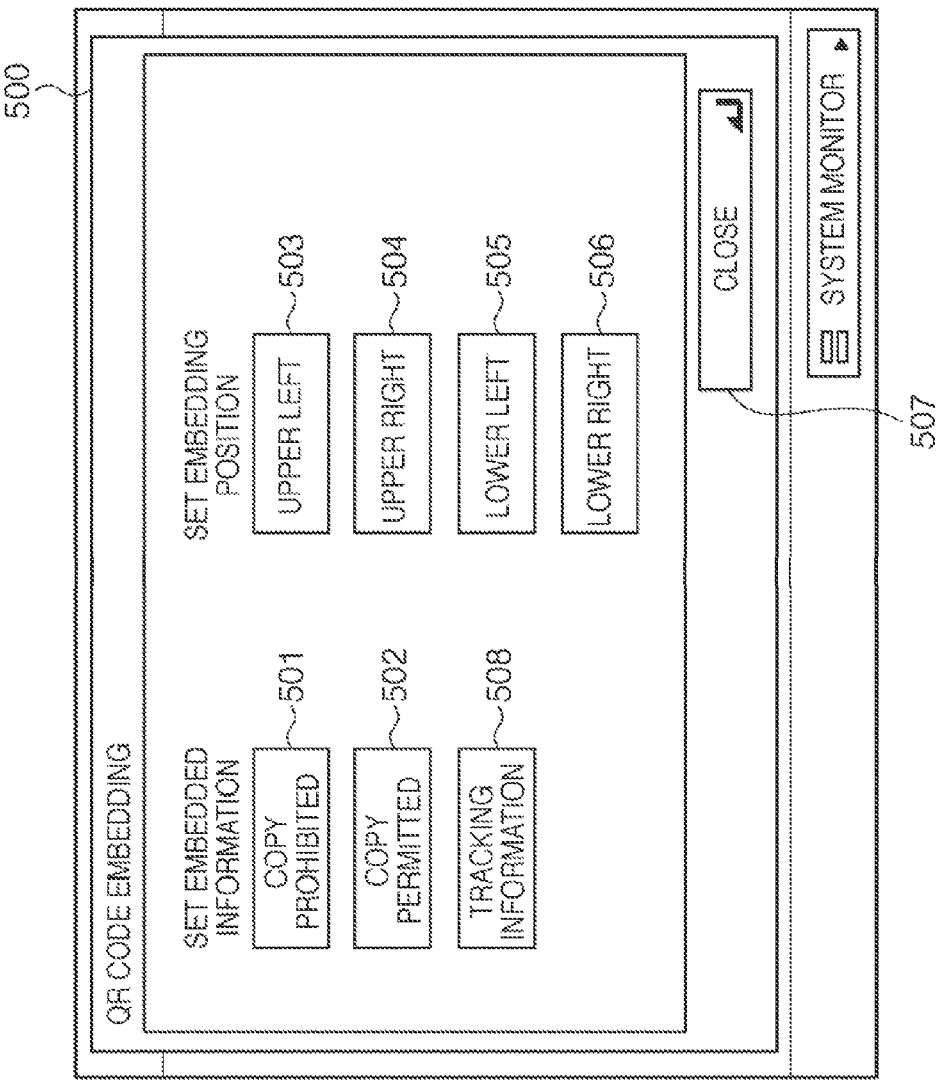
FIG. 5 is a view showing a setting screen 500 for making a QR code embedding copy setting according to the embodiment.

QR code embedding copy setting will be described with reference to FIGS. 3 to 5. A normal copy screen in the image forming apparatus 100 will be explained first with reference to FIG. 3. A copy screen 301 is displayed on the display unit (for example, touch panel) of the operation unit 112. A copy tab 302 indicates that the copy function is selected. A status display window 303 displays copy settings such as a set scaling ratio, selected paper size, and copy count.

A setting screen 400 displayed on the operation unit 112 when the user presses a special feature button 304 on the copy screen 301 will be explained with reference to FIG. 4. The setting screen 400 includes a setting button 401 for performing binding copy, a setting button 402 for performing reduction layout copy, and a setting button 406 for designating a print target area and copying. The setting screen 400 further includes a setting button 407 for designating page consecutive reading and copying, and a setting button 403 for embedding and printing a QR code in scanned original document data.

A setting screen 500 displayed on the operation unit 112 when the user presses the setting button 403 of the setting screen 400 will be described with reference to FIG. 5. The setting screen 500 is used to embed a QR code. The setting screen 500 includes a setting button 501 for setting "copy prohibited" as information to be embedded, a setting button 502 for setting "copy permitted", and a setting button 508 for setting tracking information. The tracking information indicates, for example, copyright information of an original document, and is embedded to assert the copyright or the like when, for example, the original document is copied illicitly. In the setting screen 500, embedding position setting buttons 503 to 506 are arranged to set a position where a QR code is embedded in an original document. As shown in FIG. 5, when the user presses one of the embedding position setting buttons 503 to 506, a QR code embedding position is set at the upper left, upper right, lower left, or lower right position of paper. The set contents are transmitted to the CPU 201 via the operation unit I/F 206, and at the same time, saved in the RAM 202.

<QR Code Embedding Copy Operation>

A QR code embedding copy operation when the user selects the button 508 for setting tracking information as embedded information and the button 504 for setting an upper right position as an embedding position in the setting screen 500 will be described with reference to FIG. 6.

Figure 6:
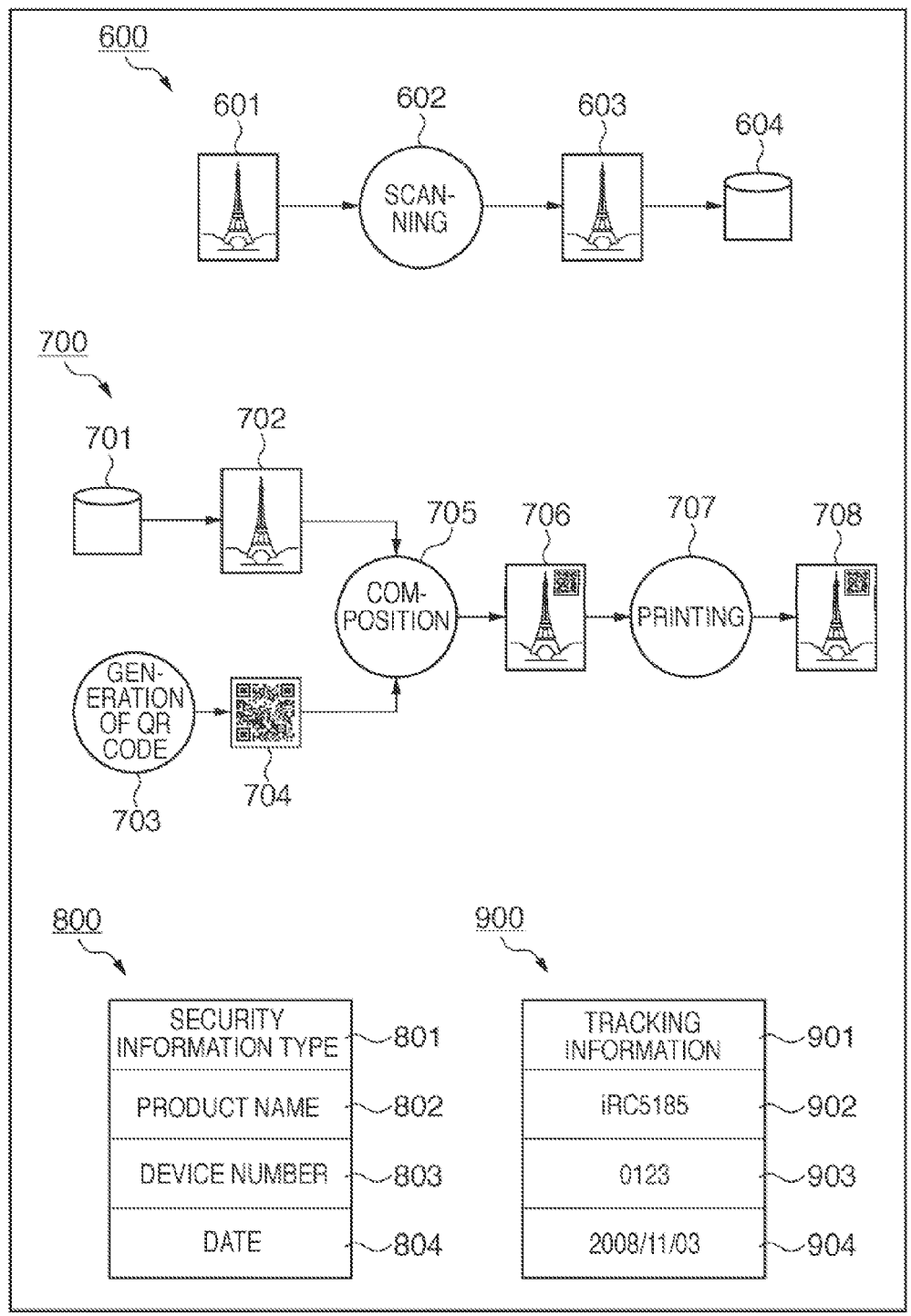
FIG. 6 is a view showing an operation sequence when scanning an original document, embedding a QR code, and printing according to the embodiment.

In FIG. 6, reference numeral 600 denotes a data sequence when scanning an original document. Reference numeral 601 denotes an original document to be copied. The user sets the original document 601 on the tray 102 of the original document feeder 101, and selects "tracking information" as embedded information and "upper right" as an embedding position in the setting screen 500. When the user issues a reading start instruction in this state, the scanner 113 receives the original document reading instruction. Reference numeral 602 denotes a reading operation of feeding and reading the original document 601 when the scanner 113 receives the instruction. Reference numeral 603 denotes read image data. Reference numeral 604 denotes processing of rasterizing the read image data 603 in the RAM 202 and writing the image data in the HDD 204. After the processing 604, the processing by the scanner 113 ends.

Processing on the printer side will be explained with reference to 700 in FIG. 6. Reference numeral 701 denotes processing of reading out, to the RAM 202, image data saved in the HDD 204. Reference numeral 702 denotes image data rasterized in the RAM 202. Reference numeral 703 denotes QR code generation processing. In the QR code generation processing, the QR code generation unit 260 is used to generate a QR code from "tracking information" set as embedded information in the setting screen 500. Reference numeral 800 denotes tracking information. The tracking information 800 contains a security information type 801, product name 802, device number 803, and date 804. For descriptive convenience, information having contents as represented by 900 is embedded as a QR code. More specifically, "tracking information" 901 is stored as the security information type 801, "iRC5185" 902 is stored as the product name 802, "0123" 903 is stored as the device number 803, and "2008/11/03" 904 is stored as the date 804. The QR code generation unit 260 generates a QR code 704 based on the information 900.

The generated QR code 704 is rasterized in the RAM 202. Subsequently in composition processing 705, the image composition unit 240 composites the QR code 704 in the image data 702 so that the QR code 704 is embedded at the "upper right" position set in the setting screen 500. Composited image data 706 is rasterized in the RAM 202, transferred to the printer 114, and printed (707) on paper. As a result, a QR code-embedded output result 708 is obtained.

<Copy Operation Based on Area Designation for QR Code-Embedded Original Document>

Figure 7:
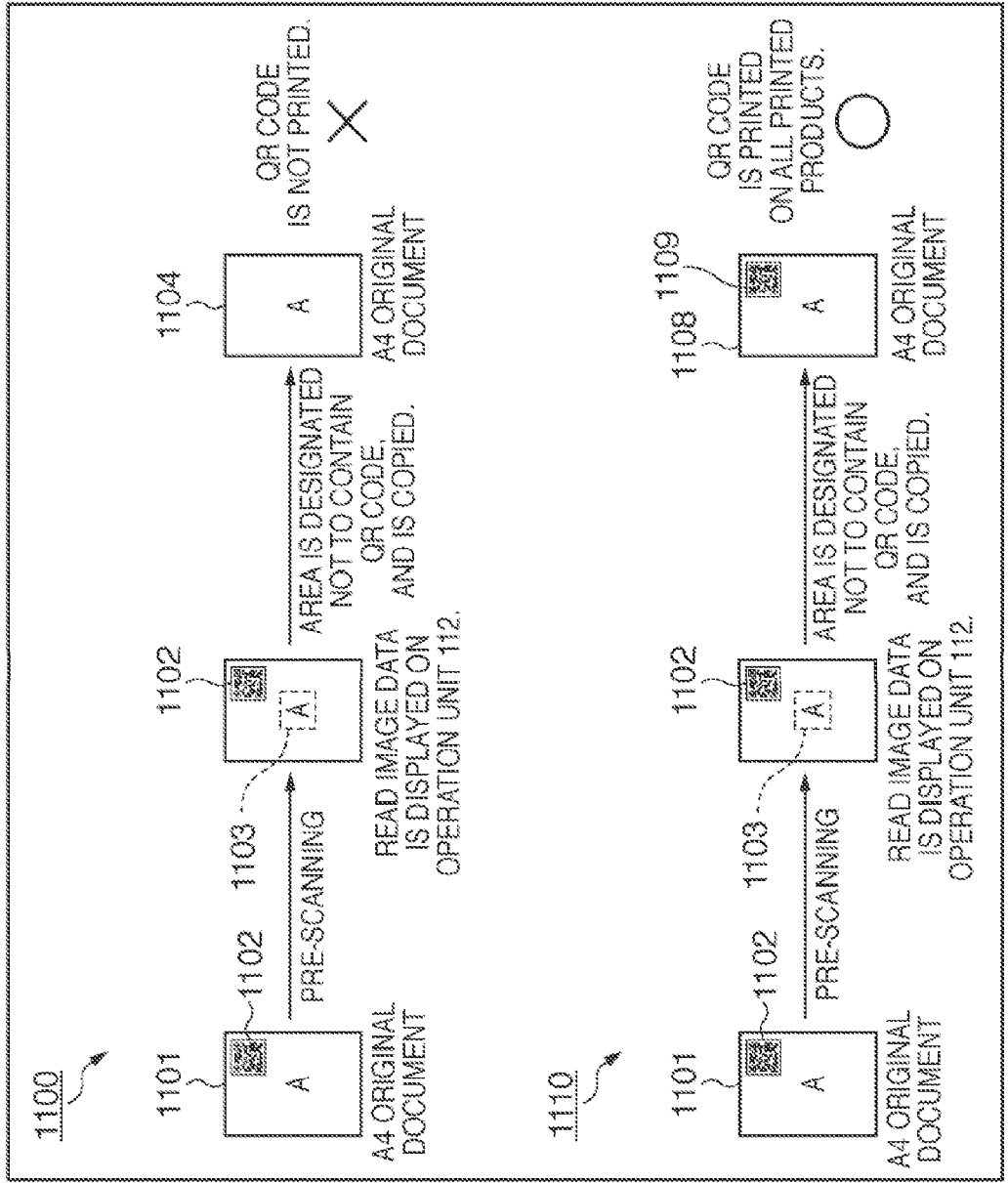
FIG. 7 is a view showing a copy result when an area is designated for a QR code-embedded original document.

A copy operation when an area containing no QR code is designated as a print target area for a QR code-embedded original document will be described with reference to FIG. 7. An operation (conventional operation) 1100 does not consider a QR code embedded in an original document. An operation (operation in the embodiment) 1110 considers an embedded QR code.

The conventional operation 1100 will be explained first. A QR code 1102 is printed on an A4-size original document 1101. When copying this original document based on area designation, the scanner 113 reads (pre-scans) the original document, and the operation unit 112 displays the read image data. The user designates an area 1103 indicated by a broken line in the image displayed on the operation unit 112 so as not to contain the QR code, and starts copying. Then, he can obtain a printed product containing no QR code, as represented by a print result 1104. In contrast, the operation 1110 in the embodiment solves this problem by procedures to be described below, and implements area copying so as to contain a QR code, as represented by 1108.

Figure 8:
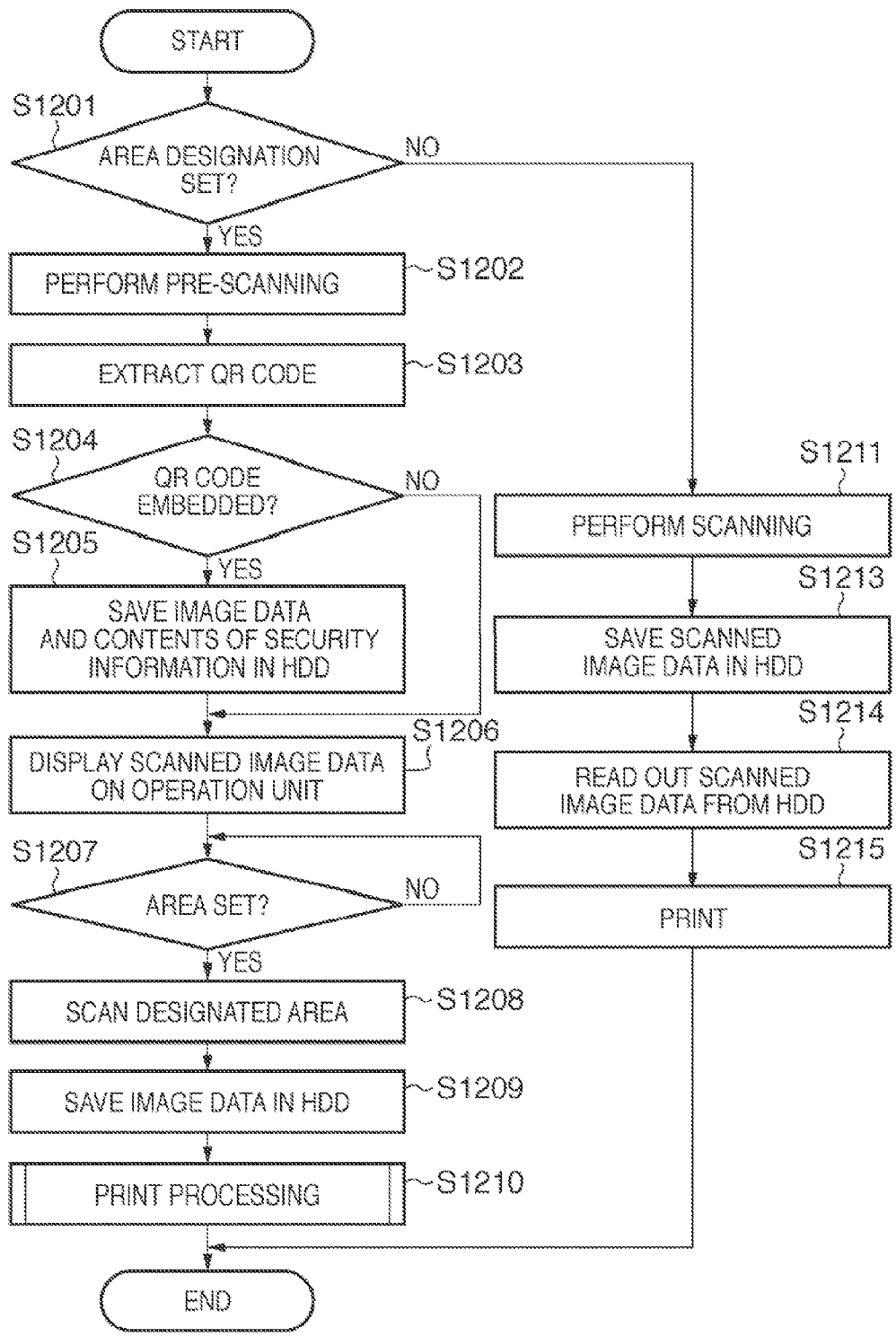
FIG. 8 is a flowchart showing the processing sequence of a copy operation according to the embodiment.

A concrete copy operation in the embodiment will be described with reference to FIG. 8. The CPU 201 implements the following processing by expanding, in the RAM 202, a program stored in the ROM 203 or HDD 204, and executing it. In the following description, a number subsequent to "S" indicates a step number in the flowchart.

In S1201, after the user sets a print target area, the CPU 201 determines whether he has issued a reading start instruction via the operation unit 112. The print target area is set via the setting button 406. If the user has not set the print target area, the process advances to S1211, and the CPU 201 gives an original document reading instruction to the scanner 113. Upon receiving the instruction, the scanner 113 reads an original document, and rasterizes the read image data in the RAM 202. In S1213, the CPU 201 saves the rasterized image data in the HDD 204. In S1214, the CPU 201 reads out the image data saved in the HDD 204, and causes the printer 114 to print in S1215.

If the user has set the print target area, the process advances to S1202, and the CPU 201 gives an original document reading instruction to the scanner 113. The scanner 113 functions as the first reading unit to read (pre-scan) the original document upon receiving the instruction, and rasterize the read image data in the RAM 202. In S1203, if the image data rasterized in the RAM 202 contains a QR code, the CPU 201 causes the information extraction unit 270 to extract the QR code. In S1204, the CPU 201 determines whether the QR code has been extracted in S1203. If the QR code has been extracted, the process advances to S1205, and the CPU 201 writes image data of the QR code and the contents of the extracted security information in the HDD 204. The process then advances to S1206. If the CPU 201 determines in S1204 that no QR code has been extracted, the process advances to S1206.

In S1206, the CPU 201 displays, on the operation unit 112, the image data rasterized in the RAM 202. The CPU 201 functions as a display control unit to display the image data on the display unit of the operation unit 112 so that the user can designate a reading area in the original document. In S1207, the CPU 201 waits until the user sets the print target area (reading area). After the user sets the print target area, the process advances to S1208. The print target area may be set by designating an image displayed on the operation unit 112 with a touch pen, or inputting a position using numeric keys arranged on the operation unit 112. In S1208, the CPU 201 instructs the scanner 113 to read only an area of the original document that has been set as the print target area in S1207. The scanner 113 functions as the second reading unit to read the original document in accordance with the set reading area upon receiving the instruction, and rasterize the read image data in the RAM 202. In S1209, the CPU 201 writes the rasterized image data in the HDD 204, ending the processing on the scanner side. In S1210, the CPU 201 causes the printer 114 to print using the image data saved in the HDD 204.

In S1207, after obtaining image data of the entire reading area in the original document, image data of an area other than the print target area may be deleted from the image data of the entire area.

Figure 9:
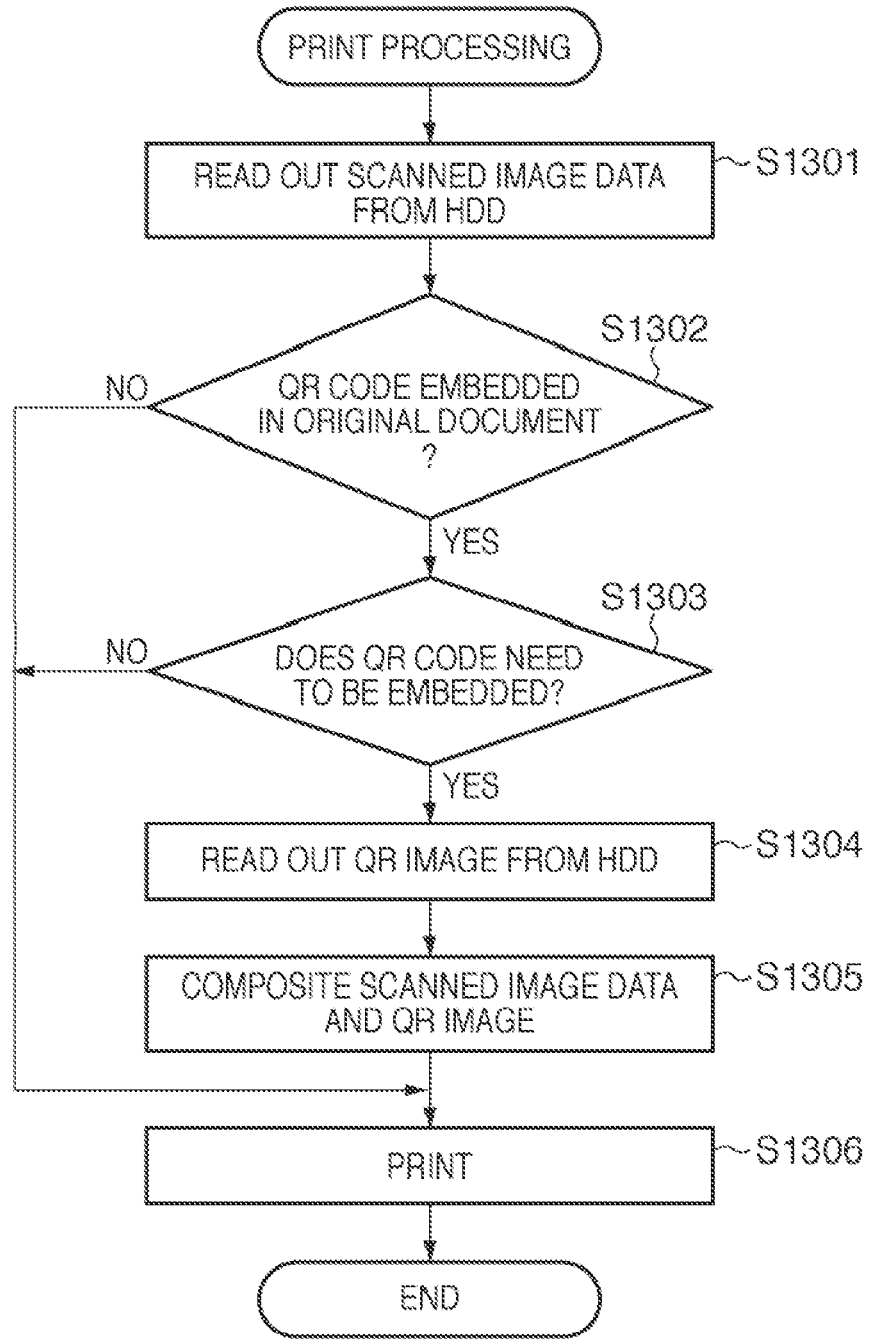
FIG. 9 is a flowchart showing the processing sequence of a print operation according to the embodiment.

Details of print processing in S1210 will be explained with reference to FIG. 9. The CPU 201 implements the following processing by expanding, in the RAM 202, a program stored in the ROM 203 or HDD 204, and executing it. In the following description, a number subsequent to "S" indicates a step number in the flowchart.

In S1301, the CPU 201 reads out, to the RAM 202, image data which has been saved in the HDD 204 in S1209. In S1302, the CPU 201 determines, based on QR code information which has been saved in S1205, whether a QR code has been embedded in the original document. If no QR code has been embedded, the process advances to S1306. In S1306, the CPU 201 transfers, to the printer 114, the image data which has been rasterized in the RAM 202 in S1301, and causes the printer 114 to execute print processing.

If the CPU 201 determines in S1302 that a QR code has been embedded, the process advances to S1303, and the CPU 201 determines whether image data needs to be printed together with the QR code embedded in the original document. More specifically, the CPU 201 refers to the security information type of the QR code information which has been saved in S1205. If the security information type indicates "tracking information", the CPU 201 determines that the QR code needs to be printed together with the image data, and the process advances to S1304. If the security information type indicates information other than "tracking information", the CPU 201 determines that the QR code need not be printed together with the image data. Then, the process advances to S1306, and the CPU 201 causes the printer 114 to execute print processing.

In S1304, the CPU 201 reads out, to the RAM 202, image data of the QR code that has been saved in the HDD 204 in S1205. In S1305, the CPU 201 causes the image composition unit 240 to composite the image data that has been rasterized in the RAM 202 in S1301, and the image data of the QR code that has been rasterized in the RAM 202 in S1304. The composited image data is rasterized in the RAM 202. In S1306, the CPU 201 transfers the rasterized image data to the printer 114, and causes the printer 114 to execute print processing.

<Copy Operation Based on Page Consecutive Reading Designation for QR Code-Embedded Original Document>

A copy operation when page consecutive reading designation is set for a QR code-embedded original document will be described with reference to FIG. 10. An operation (conventional operation) 1400 does not consider a QR code embedded in an original document. An operation (operation in the embodiment) 1410 considers an embedded QR code.

The conventional operation 1400 will be explained first. A QR code 1402 is printed on an A3-size original document 1401. When copying this original document based on page consecutive reading designation, the scanner 113 reads one side (for example, "A"-printed left side) of the original document, obtaining a print result 1403. Subsequently, the scanner 113 reads the other side (for example, "B"-printed right side), obtaining a print result 1404. In this way, the page consecutive reading designation is a setting of dividing one original document into a plurality of pages, reading them, and printing each divided/read page.

Figure 10:
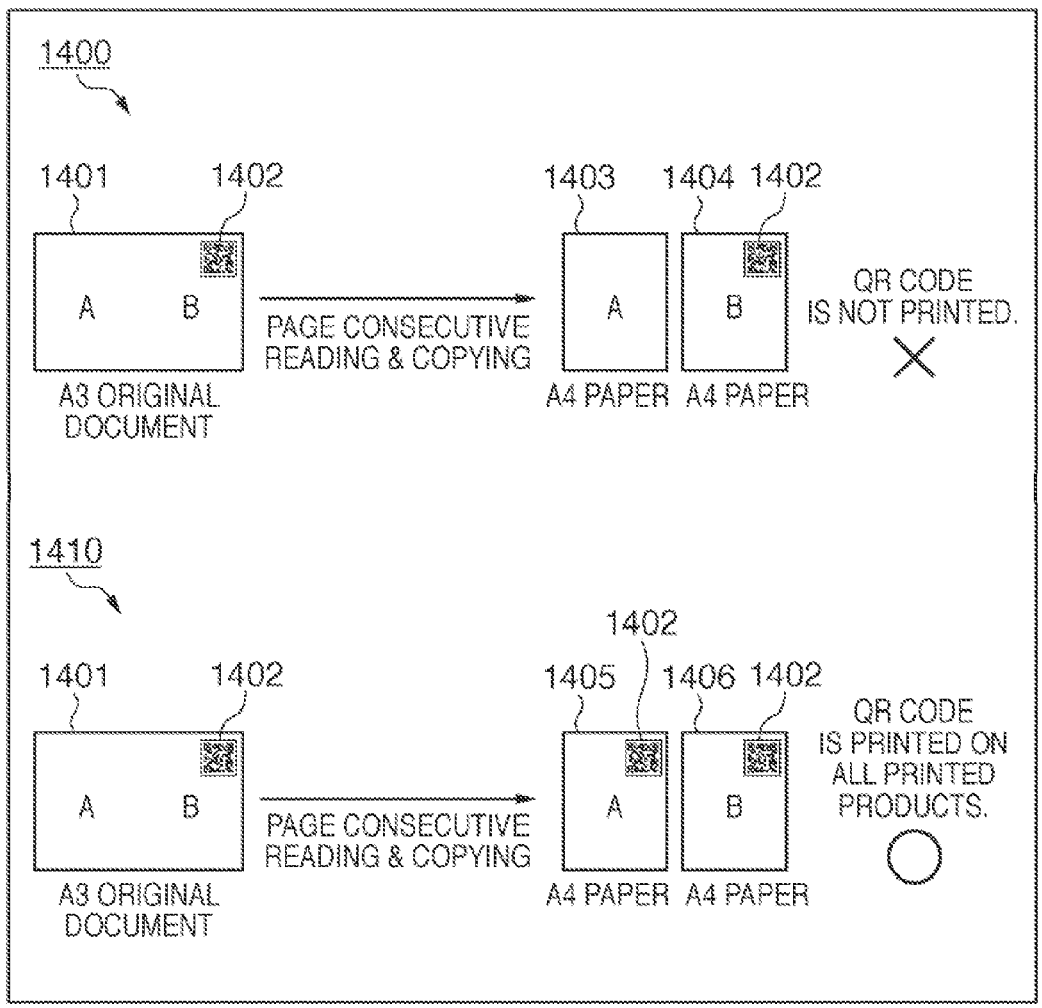
FIG. 10 is a view showing a copy result when page consecutive reading is designated for a QR code-embedded original document.

As shown in FIG. 10, the QR code 1402 printed on the original document is embedded in the print result 1404, but is not embedded in the print result 1403. The embodiment solves this problem by procedures to be described below, and implements copying with the page consecutive reading setting so as to embed a QR code in all printed products, as represented by 1405 and 1406.

Figure 11:
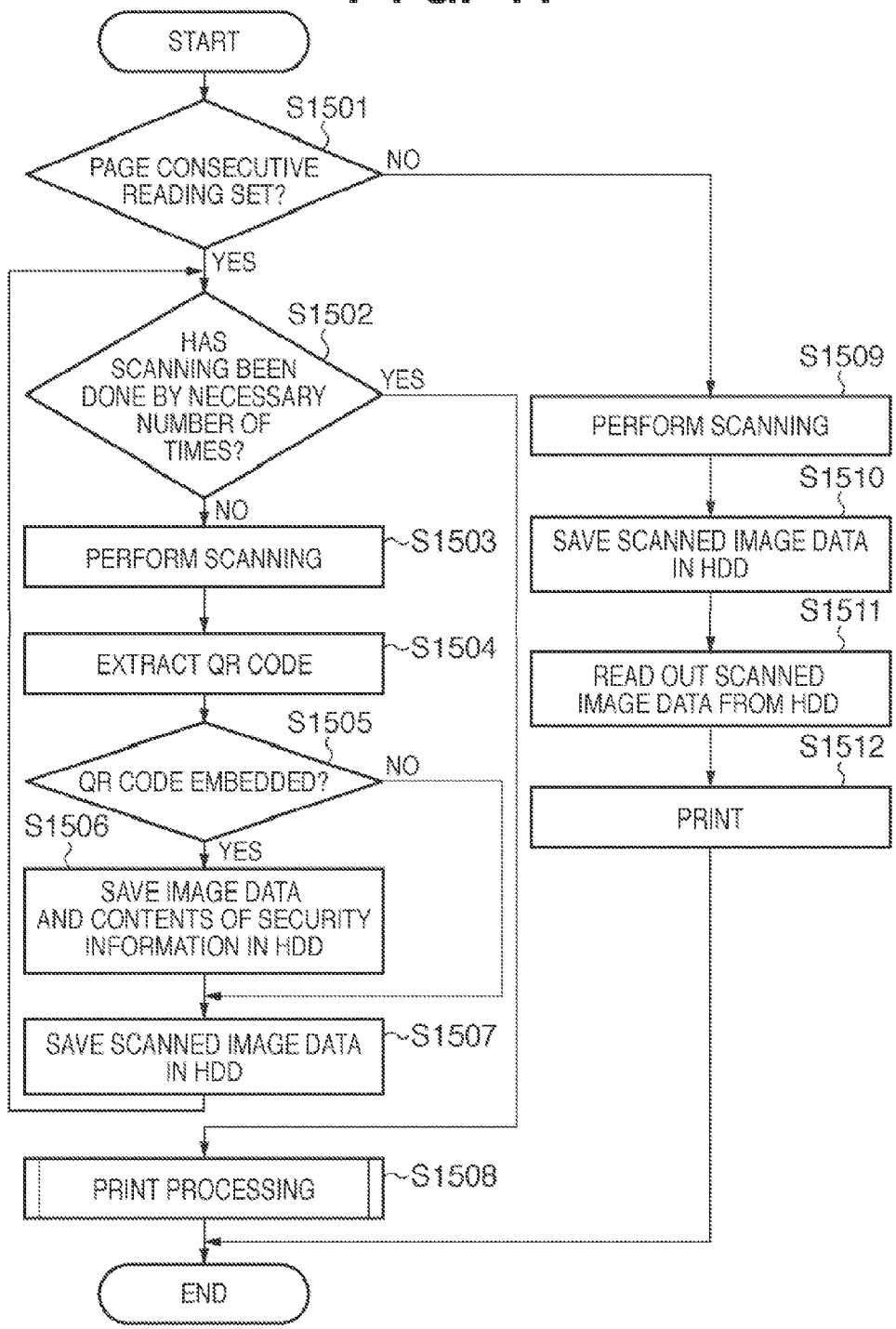
FIG. 11 is a flowchart showing the processing sequence of a copy operation based on page consecutive reading designation according to the embodiment.

A concrete copy operation when page consecutive reading designation in the embodiment is set will be described with reference to FIG. 11. The CPU 201 implements the following processing by expanding, in the RAM 202, a program stored in the ROM 203 or HDD 204, and executing it. In the following description, a number subsequent to "S" indicates a step number in the flowchart.

In S1501, after the user sets page consecutive reading, the CPU 201 determines whether he has issued a reading start instruction via the operation unit 112. Page consecutive reading is set by pressing the page consecutive reading setting button 407. If the user has set page consecutive reading, the process advances to S1502, and the CPU 201 determines whether scan processing has been done by a necessary number of times. More specifically, the CPU 201 determines whether the left and right sides of the original document have been scanned. If scan processing has not been done by a necessary number of times, the process advances to S1503; if YES, to S1508, and print processing is executed.

In S1503, the CPU 201 instructs the scanner 113 to read one side of the original document. Upon receiving the reading instruction, the scanner 113 functions as a reading unit to read the original document and rasterize the read image data in the RAM 202. In S1504, the CPU 201 causes the information extraction unit 270 to cut out and extract a QR code from the image data rasterized in the RAM 202. In S1505, the CPU 201 determines whether the QR code has been extracted in S1504. If the QR code has been extracted, the process advances to S1506, and the CPU 201 writes image data of the QR code and the contents of the extracted security information in the HDD 204. The process then advances to S1507. If the CPU 201 determines in S1505 that no QR code has been extracted, the process advances to S1507. In S1507, the CPU 201 writes, in the HDD 204, the image data rasterized in S1503, and the process returns to S1502.

If the CPU 201 determines in S1501 that the user has not set page consecutive reading, the CPU 201 gives a reading instruction to the scanner 113 in S1509. In S1510, the scanner 113 saves, in the HDD 204, image data which has been rasterized from the original document by the scanner 113 in the RAM 202. In S1511, the CPU 201 reads out the image data saved in the HDD 204, and transfers it to the printer 114. In S1512, the CPU 201 causes the printer 114 to execute print processing, ending the process.

Figure 12:
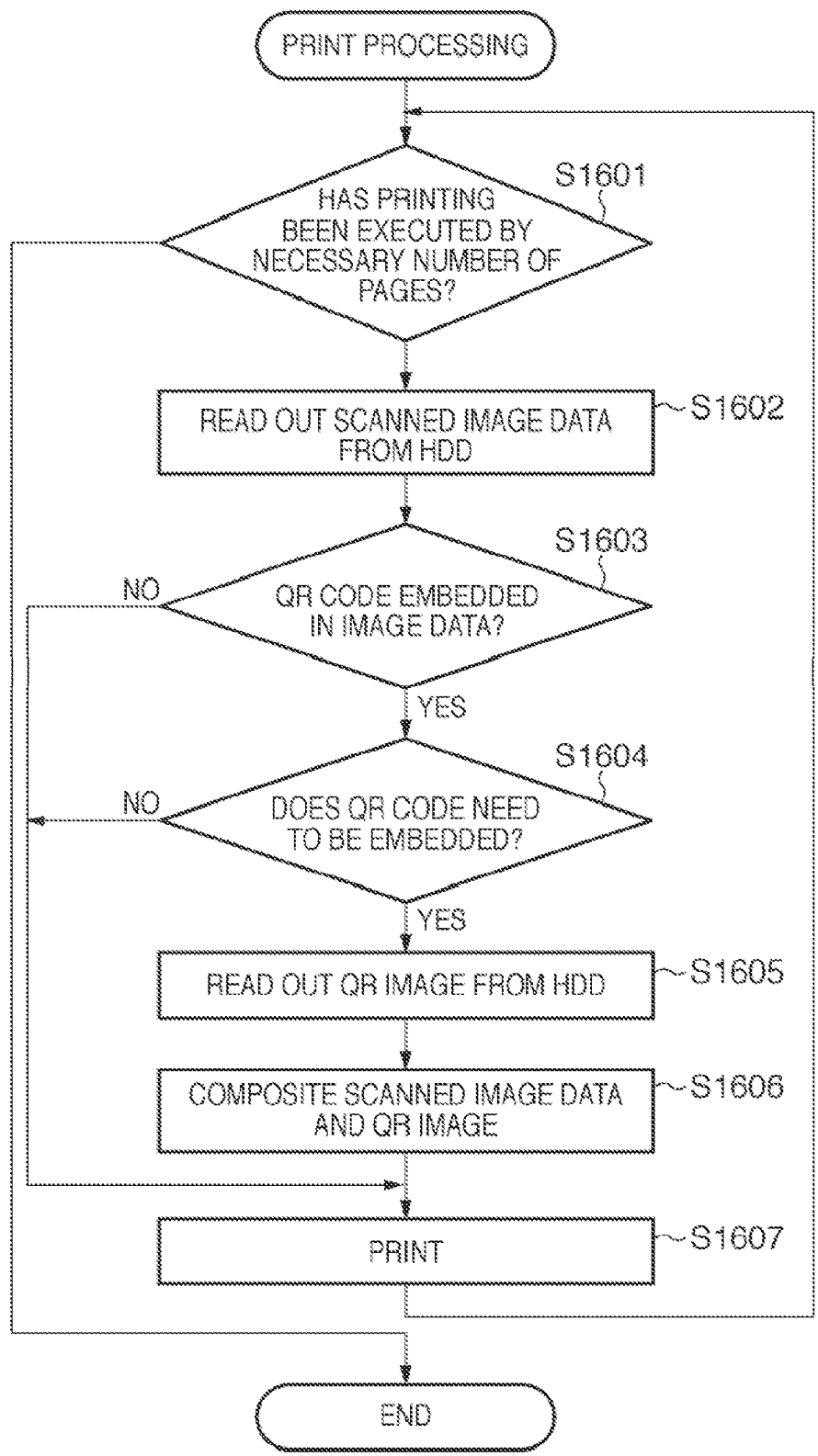
FIG. 12 is a flowchart showing the processing sequence of a print operation based on page consecutive reading designation according to the embodiment.

Details of print processing in S1508 will be explained with reference to FIG. 12. The CPU 201 implements the following processing by expanding, in the RAM 202, a program stored in the ROM 203 or HDD 204, and executing it. In the following description, a number subsequent to "S" indicates a step number in the flowchart.

In S1601, the CPU 201 determines whether print processing has been executed by a necessary number of pages. More specifically, the CPU 201 determines whether the print processing has been executed by the number of scan operations in S1503. If print processing has not been executed by a necessary number of pages, the process advances to S1602, and the CPU 201 reads out, to the RAM 202, image data which has been saved in the HDD 204 in S1507. In S1603, the CPU 201 determines, based on QR code information which has been saved in S1506, whether a QR code has been embedded in the image data. If no QR code has been embedded, the process advances to S1607. In S1607, the CPU 201 transfers, to the printer 114, the image data which has been rasterized in the RAM 202 in S1602, and causes the printer 114 to execute print processing.

If the CPU 201 determines in S1603 that a QR code has been embedded, the process advances to S1604, and the CPU 201 determines whether image data needs to be used for print processing together with the QR code embedded in the original document. More specifically, the CPU 201 refers to the security information type of the QR code information that has saved in S1506. If the security information type indicates "tracking information", the CPU 201 determines that the QR code needs to be used for print processing together with the image data, and the process advances to S1605. If the security information type indicates information other than "tracking information", the CPU 201 determines that the QR code need not be used for print processing together with the image data. Then, the process advances to S1607, and the CPU 201 causes the printer 114 to execute print processing.

In S1605, the CPU 201 reads out, to the RAM 202, image data of the QR code that has been saved in the HDD 204 in S1506. In S1606, the CPU 201 causes the image composition unit 240 to composite the image data that has been rasterized in the RAM 202 in S1602, and the image data of the QR code that has been rasterized in the RAM 202 in S1605. In S1607, the CPU 201 rasterizes the composited image data in the RAM 202, transfers the rasterized image data to the printer 114, and causes the printer 114 to execute print processing.

<Copy Operation Based on Reduction Scaling Designation for QR Code-Embedded Original Document>

Figure 13:
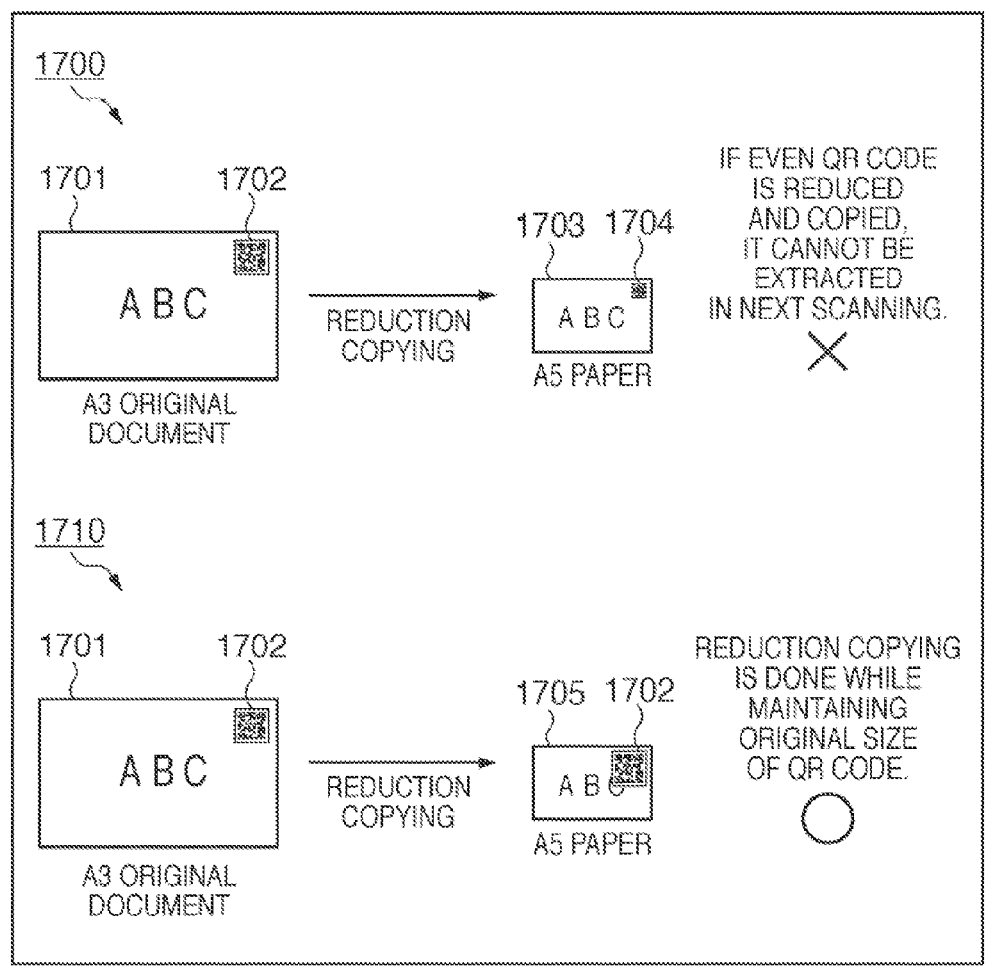
FIG. 13 is a view showing a copy result when scaling is designated for a QR code-embedded original document.

A copy operation when reduction scaling is set for a QR code-embedded original document will be described with reference to FIG. 13. An operation (conventional operation) 1700 does not consider a QR code embedded in an original document. An operation (operation in the embodiment) 1710 considers an embedded QR code.

The conventional operation 1700 will be explained first. A QR code 1702 is printed on an A3-size original document 1701. When copying this original document on A5-size paper based on reduction scaling designation (50% reduction), the scanner 113 reads the original document, and the image scaling unit 230 reduces the image data. Print processing is executed based on the reduced image data. On A5 paper 1703, a QR code 1704 printed on the original document is embedded. In this print result, however, even the QR code 1704 is reduced to 50%. When the A5-size paper is scanned again, information of the QR code 1704 cannot be extracted accurately because the QR code 1704 has been reduced to a size exceeding the extraction ability of the information extraction unit 270. To prevent this, the embodiment executes reduction copying not to perform reduction scaling processing for the QR code 1702 itself, like the QR code 1702 printed on A5 paper 1705 represented in the operation 1710.

Figure 14:
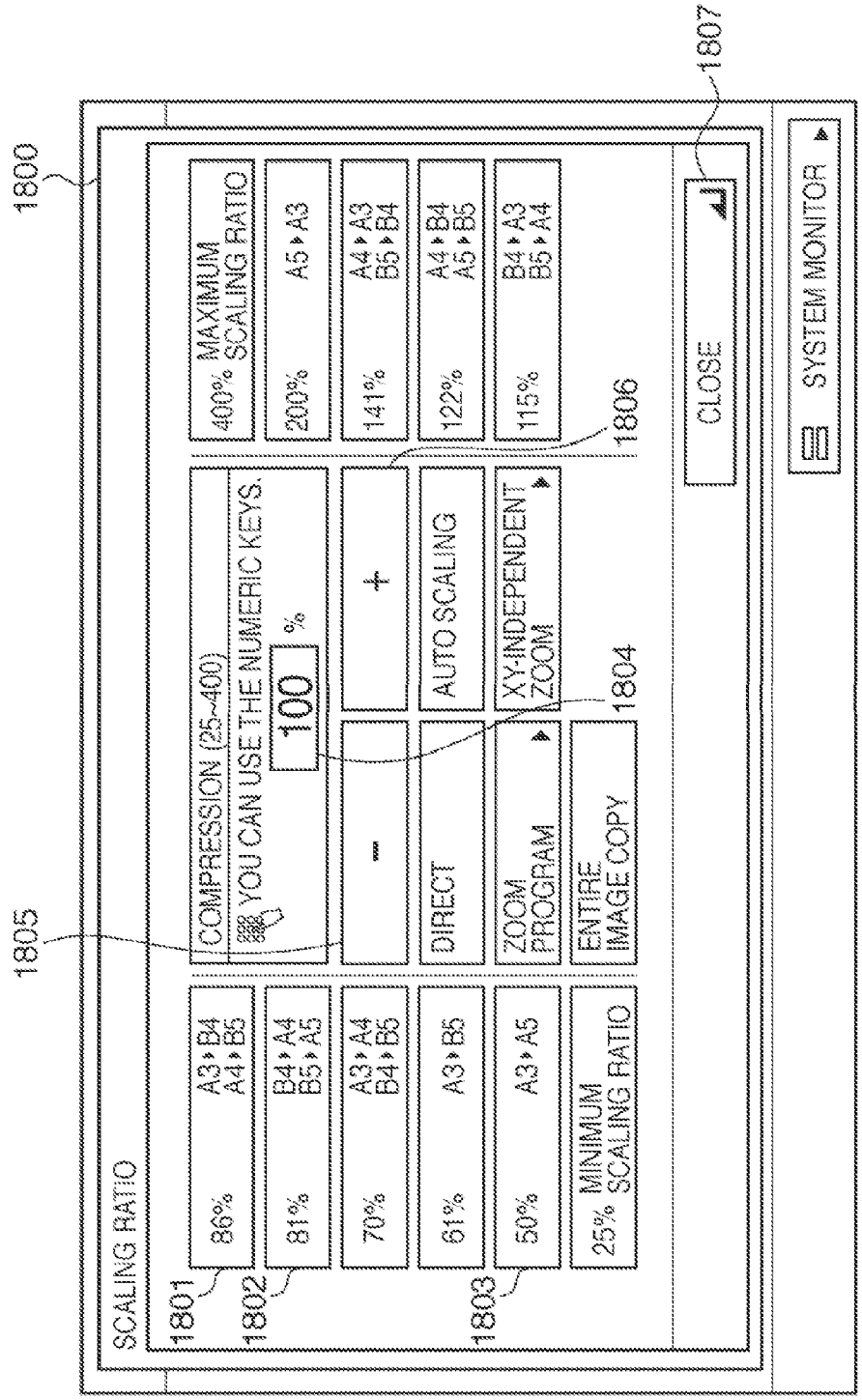
FIG. 14 is a view showing a setting screen 1800 for designating scaling according to the embodiment.

A reduction scaling copy setting method will be described with reference to FIGS. 3 and 14. When setting reduction scaling copying, the user presses a scaling ratio setting button 305 in the copy screen 301 in FIG. 3. In response to this, the operation unit 112 displays a scaling ratio setting screen 1800 shown in FIG. 14.

In the setting screen 1800, setting buttons such as setting buttons 1801, 1802, and 1803 are arranged to reduce and scale an original document of each size and print it. In the setting screen 1800, a window 1804 displays a set scaling ratio. The user can also freely set the scaling ratio using buttons 1805 and 1806. When the user presses a close button 1807, current settings are reflected, and the setting screen 1800 returns to the copy screen 301.

Figure 15:
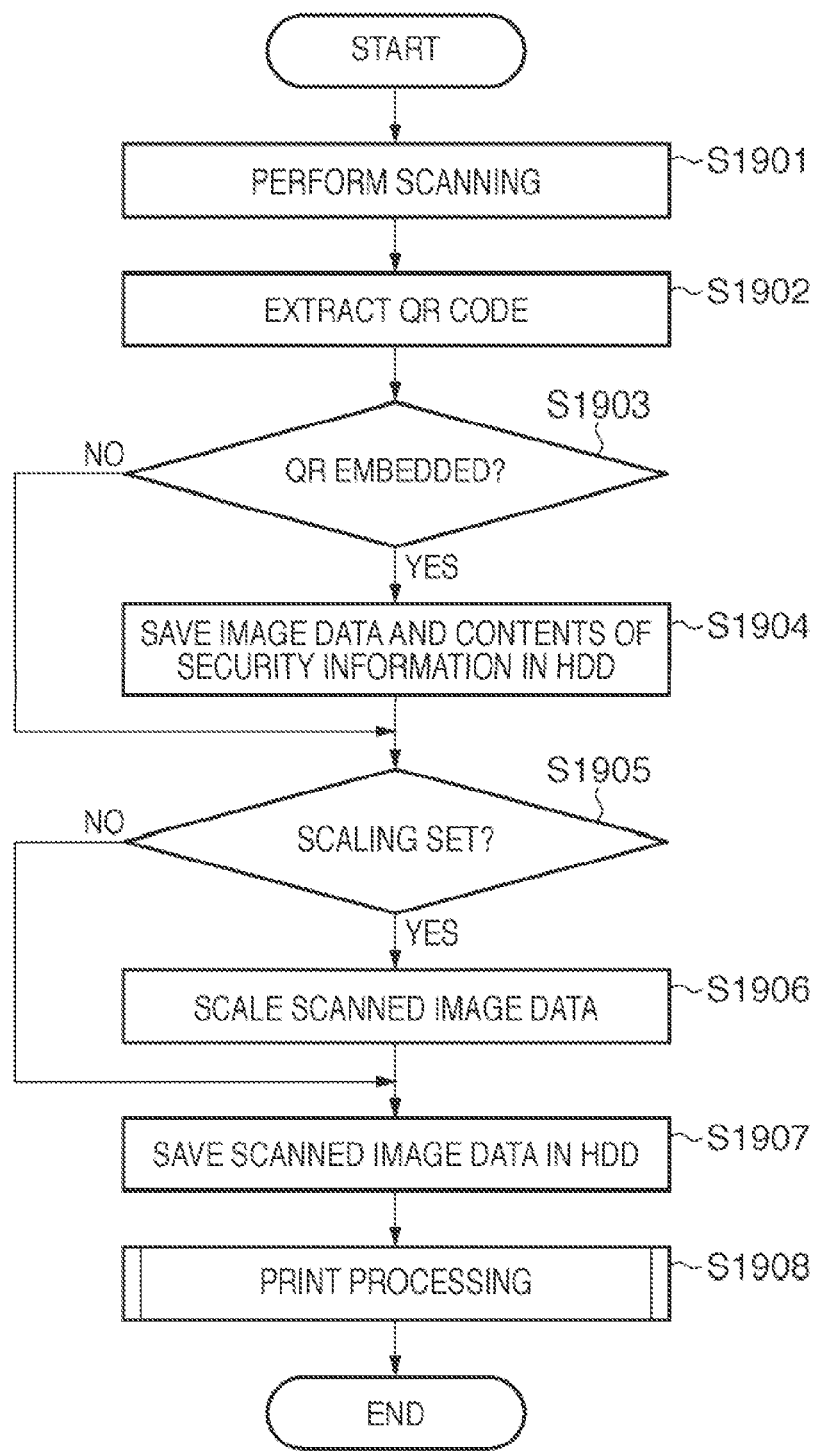
FIG. 15 is a flowchart showing the processing sequence of a copy operation based on scaling designation according to the embodiment.

A concrete copy operation when reduction scaling designation in the embodiment is set will be described with reference to FIG. 15. The CPU 201 implements the following processing by expanding, in the RAM 202, a program stored in the ROM 203 or HDD 204, and executing it. In the following description, a number subsequent to "S" indicates a step number in the flowchart.

In S1901, the CPU 201 issues an original document reading instruction to the scanner 113. The scanner 113 functions as a reading unit to read an original document upon receiving the instruction, and rasterize it as image data in the RAM 202. In S1902, the CPU 201 causes the information extraction unit 270 to extract a QR code from the image data rasterized in the RAM 202. Unlike S1203 and S1504, it suffices to extract only the QR code without cutting out image data of the QR code from the rasterized image data. In S1903, the CPU 201 determines whether the QR code has been extracted in S1902. If the QR code has been extracted, the CPU 201 writes image data of the QR code and the contents of the extracted security information in the HDD 204 in S1904. After that, the process advances to S1905. If the CPU 201 determines in S1903 that no QR code has been extracted, the process advances to S1905.

In S1905, the CPU 201 determines whether scaling has been set. If scaling has been set, the process advances to S1906, and the CPU 201 causes the image scaling unit 230 to scale the image data at a set scaling ratio, and the process advances to S1907. If no scaling has been set, the process advances to S1907. In S1907, the CPU 201 writes the image data in the HDD 204, and executes print processing in S1908.

Figure 16:
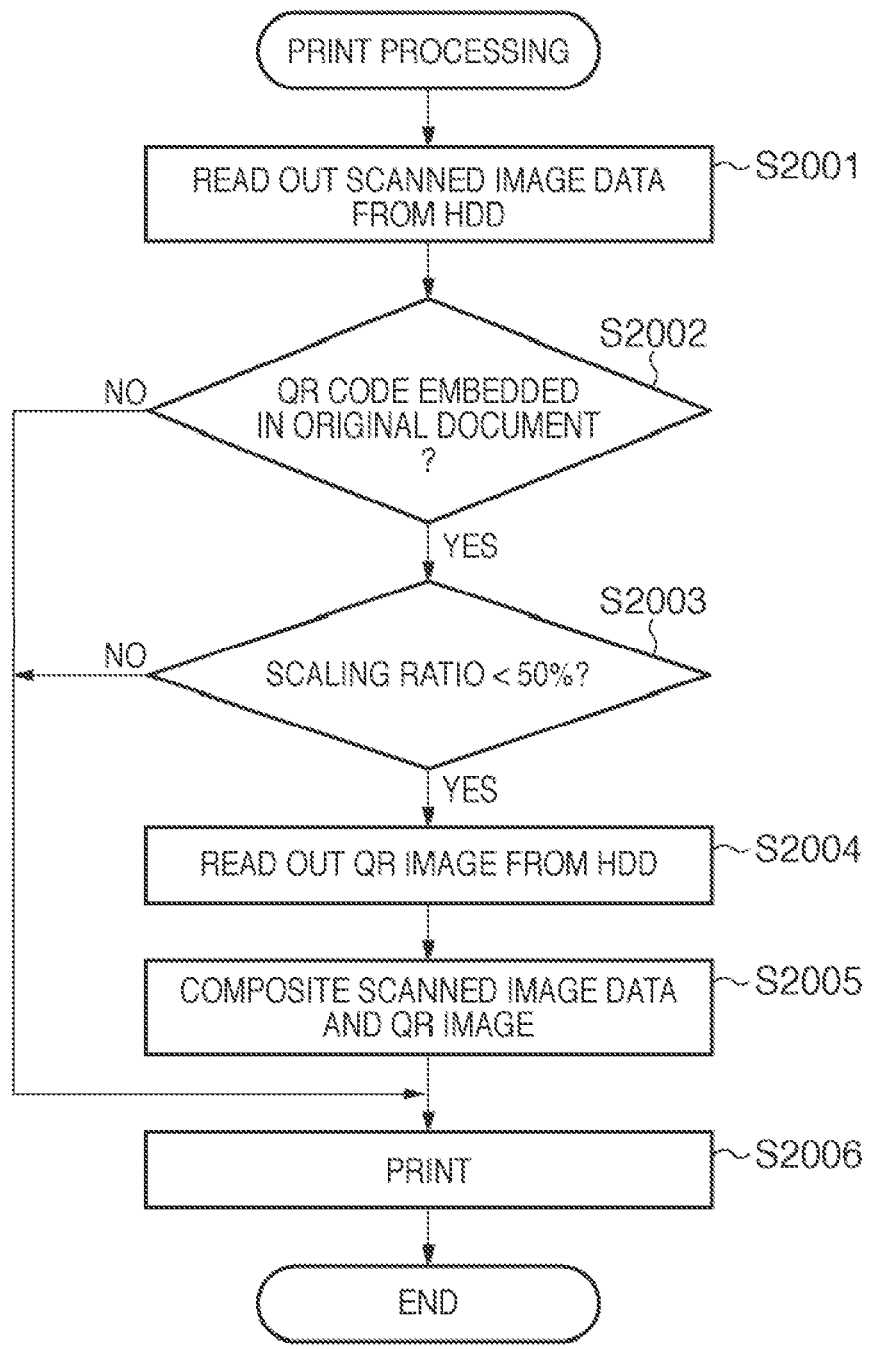
FIG. 16 is a flowchart showing the processing sequence of a print operation based on scaling designation according to the embodiment.

Details of print processing in S1908 will be explained with reference to FIG. 16. The CPU 201 implements the following processing by expanding, in the RAM 202, a program stored in the ROM 203 or HDD 204, and executing it. In the following description, a number subsequent to "S" indicates a step number in the flowchart.

In S2001, the CPU 201 reads out, to the RAM 202, image data which has been saved in the HDD 204 in S1907. In S2002, the CPU 201 determines, based on QR code information which has been saved in S1904, whether a QR code has been embedded in the image data. If no QR code has been embedded, the process advances to S2005, and the CPU 201 transfers, to the printer 114, the image data rasterized in the RAM 202, and causes the printer 114 to execute print processing.

If a QR code has been embedded, the process advances to S2003. If the CPU 201 determines that the scaling ratio in S1905 is lower than 50%, the process advances to S2004, and the CPU 201 reads out, to the RAM 202, image data of the QR code that has been saved in the HDD 204 in S1907. In S2005, the CPU 201 causes the image composition unit 240 to composite the image data that has been rasterized in the RAM 202 in S2001, and the image data of the QR code that has been rasterized in the RAM 202 in S2004. If the CPU 201 determines in S2003 that the scaling ratio is equal to or higher than 50%, the process advances to S2006. In S2006, the CPU 201 rasterizes the composited image data in the RAM 202, transfers it to the printer 114, and causes the printer 114 to execute print processing. In this example, it is determined in S2003 whether the scaling ratio is lower than 50% (lower than a predetermined scaling ratio). This numerical value (threshold) is based on the reading performance of the image forming apparatus 100, and means that, for example, the image forming apparatus 100 cannot recognize a QR code reduced to be smaller than 50%. The image forming apparatus in the present invention can set an arbitrary threshold in accordance with its reading performance.

As described above, for example, if area designation is set when copying a security information-embedded original document, the image forming apparatus according to the embodiment reads even an area other than the designated area in pre-scanning, extracting the security information. After that, the image forming apparatus reads the designated area. If the security information is tracking information, the image forming apparatus composites image data containing the extracted security information in the read image data, and prints the composited image data. When page consecutive reading designation is set, the image forming apparatus reads an original document for respective pages, and if security information is contained, extracts it. In this case, if the security information is tracking information, the image forming apparatus composites image data containing the extracted security information in image data of all pages, and prints the composited image data. When the scaling ratio is set in printing, the image forming apparatus extracts image data containing security information from image data obtained by reading an original document. In this case, if the security information is tracking information and the scaling ratio is lower than a predetermined threshold, the image forming apparatus composites image data containing the security information in the scaled image data, and prints the composited image data. In this fashion, the image forming apparatus according to the embodiment can reliably print tracking information even when copying an original document having area designation, page consecutive reading designation, scaling designation, or the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   a scanning unit configured to scan one sheet of an original document, the one sheet including a first area and a second area, either the first area or the second area including a barcode;
   a detecting unit configured to detect the barcode from the original document scanned by the scanning unit; and
   a print control unit configured to print, on a first sheet, an image of the first area and print, on a second sheet which is different from the first sheet, an image of the second area
   wherein the print control unit is configured to print information of the barcode detected by the detection unit to both the first sheet and the second sheet.

2. The image forming apparatus according to claim 1, wherein the barcode is QR code.

3. The image forming apparatus according to claim 1, wherein the information indicates tracking information.

4. The image forming apparatus according to claim 1, wherein the information indicates that a copy is inhibited or permitted.

5. The image forming apparatus according to claim 1, wherein the print control unit executes the print when accepting designation of a page consecutive copying.

6. The image forming apparatus according to claim 5, wherein the print control unit is configured to print the image of the original document into one sheet, in a case where the page consecutive copying is not designated.

7. The image forming apparatus according to claim 1, wherein the print control unit is configured to composite the information corresponding to the barcode detected from either the first area or the second area with an image corresponding to the other area.

8. A control method for an image forming apparatus, the method comprising:
   scanning one sheet of an original document, the one sheet including a first area and a second area, either the first area or the second area including a barcode;
   detecting the barcode from the scanned original; and
   printing, on a first sheet, an image of the first area and printing, on a second sheet which is different from the first sheet, an image of the second area;
   wherein information of the detected barcode is printed to both the first sheet and the second sheet.

9. A non-transitory computer readable storage medium for retrievably storing a computer executable program, which when executed by a computer causes the computer to perform a control method comprising:
   scanning one sheet of an original document, the one sheet including a first area and a second area, either the first area or the second area including a barcode;
   detecting the barcode from the scanned original; and
   printing, on a first sheet, an image of the first area and printing, on a second sheet, which si different from the first sheet, an image of the second area;
   wherein information of the detected barcode is printed to both the first sheet and the second sheet.

* * * * *